(12) United States Patent
Bloom et al.

(10) Patent No.: US 10,460,847 B2
(45) Date of Patent: Oct. 29, 2019

(54) GRAVITY-BASED, NON-INVASIVE REACTOR SYSTEM AND METHOD FOR COOLANT INVENTORY MONITORING

(71) Applicant: Information Systems Laboratories, Inc., Rockville, MD (US)

(72) Inventors: Scott Harris Bloom, Encinitas, CA (US); Daniel Adam Prelewicz, Rockville, MD (US); Jeffrey Richard Ridgway, San Diego, CA (US)

(73) Assignee: Information Systems Laboratories, Inc., La Jolla, CA (US)

( * ) Notice: Subject to any disclaimer, the term of this patent is extended or adjusted under 35 U.S.C. 154(b) by 359 days.

(21) Appl. No.: 15/407,509

(22) Filed: Jan. 17, 2017

(65) Prior Publication Data

US 2017/0206987 A1   Jul. 20, 2017

Related U.S. Application Data

(60) Provisional application No. 62/384,569, filed on Sep. 7, 2016, provisional application No. 62/348,331, filed on (Continued)

(51) Int. Cl.
*G21C 17/00* (2006.01)
*G21D 3/00* (2006.01)

(52) U.S. Cl.
CPC ........... *G21C 17/002* (2013.01); *G21D 3/001* (2013.01)

(58) Field of Classification Search
CPC ..... G21C 17/002; G21C 17/035; G01F 23/22; G01F 23/00; G01F 23/20; G10H 2220/395; G01V 7/04
See application file for complete search history.

(56) References Cited

U.S. PATENT DOCUMENTS 5,861,560 A * 1/1999 Harvey ............... G21C 17/022
73/861.18
9,881,704 B2 1/2018 Harris
(Continued)

OTHER PUBLICATIONS

Doyle, J. et al., "Highly Reliable Nuclear Power for Mission-Critical Applications," Proceedings of ICAPP, 2016, 8 pages.

*Primary Examiner* — Randy W Gibson
*Assistant Examiner* — Gedeon M Kidanu
(74) *Attorney, Agent, or Firm* — Cameron LLP

(57) ABSTRACT

A gravity-based, non-invasive method of measuring a level of fluid in a container comprises use of at least one gravity meter located as proximate a center of mass of the fluid as possible. In a nuclear reactor system a method for monitoring the level of fluid in a nuclear reactor module, a report of a loss or gain of fluid within a cylindrical module may be generated from capturing a time series of gravity data from a first gravity meter mounted as an upper gravity meter and a second gravity meter mounted as a lower gravity meter, for example, proximate a cylindrical nuclear reactor module so as not to require any invasive conduit through, for example, a containment pressure vessel (CPV) or a reactor pressure vessel (RPV). In one embodiment, the upper and lower gravity meters are mounted on stable mounts as close to the fluid in the module as possible within a coolant pool or a structure containing cooled air. If a coolant pool of water surrounds a nuclear reactor module, the meters may be housed within a dry housing in the coolant pool such that the meters may be accessed from above the coolant pool and are located as close as possible to the reactor module and its contained mass of fluid.

13 Claims, 8 Drawing Sheets

Related U.S. Application Data on Jun. 10, 2016, provisional application No. 62/280,569, filed on Jan. 19, 2016.

(56) References Cited

U.S. PATENT DOCUMENTS

| | | | |
|---|---|---|---|
| 2006/0117848 A1* | 6/2006 | Raffalt | G01F 23/00 73/313 |
| 2009/0277264 A1* | 11/2009 | Forkosh | F24F 3/1417 73/453 |
| 2011/0064181 A1* | 3/2011 | Moen | G01T 7/005 376/254 |
| 2015/0049851 A1* | 2/2015 | Yokoyama | G21D 3/001 376/217 |
| 2016/0027535 A1* | 1/2016 | Kanuch | G21C 15/182 376/282 |

* cited by examiner

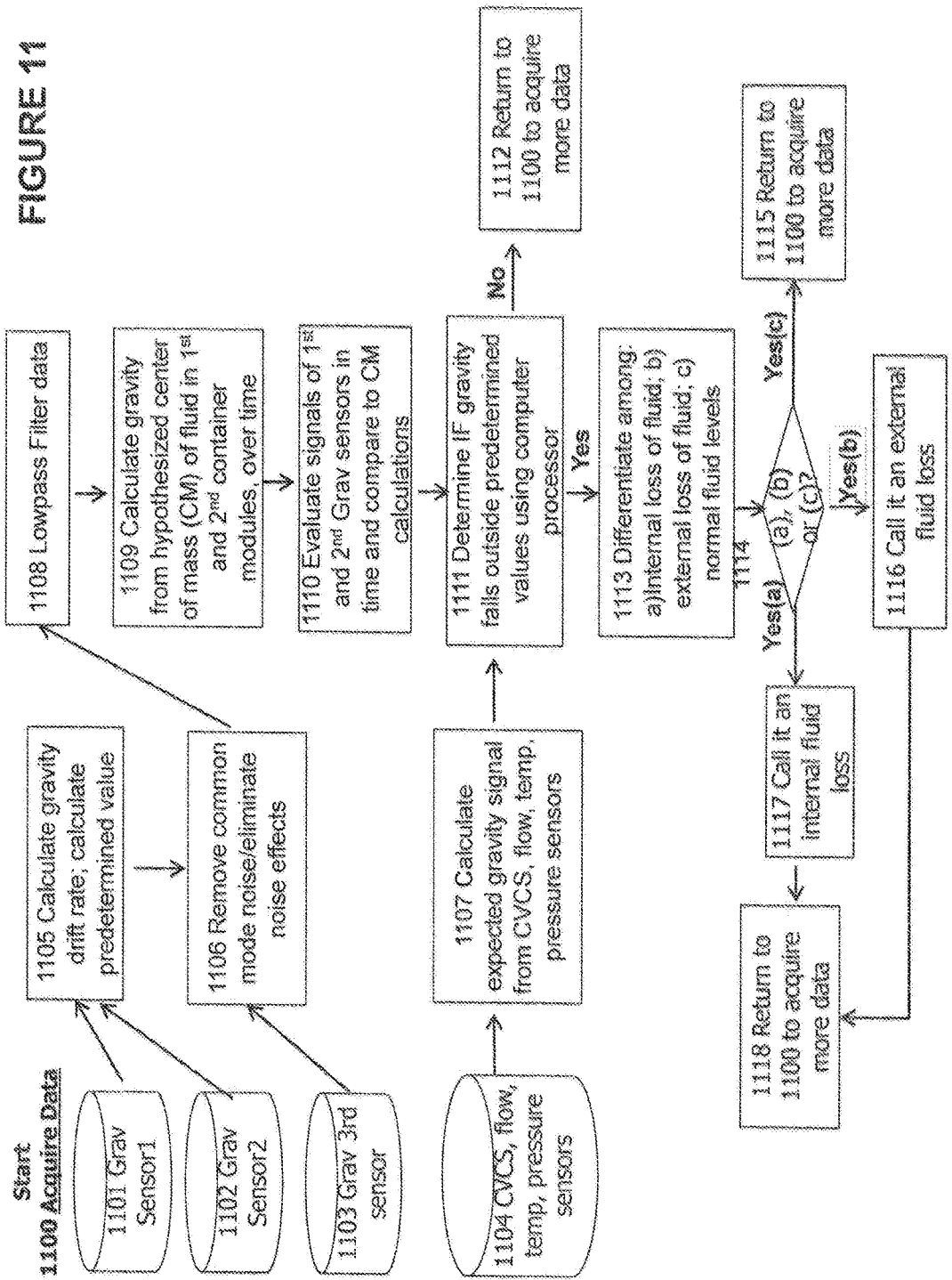

GRAVITY-BASED, NON-INVASIVE REACTOR SYSTEM AND METHOD FOR COOLANT INVENTORY MONITORING

CROSS-REFERENCE TO RELATED APPLICATIONS

The present application claims the benefit of priority to U.S. Provisional Application Ser. No. 62/280,569 filed Jan. 19, 2016, of Jeffrey R. Ridgway and Scott H. Bloom, also the benefit of priority to U.S. Provisional Application Ser. No. 62/348,331 filed Jun. 10, 2016, of Jeffrey R. Ridgway, Scott H. Bloom and Daniel Adam Prelewicz, and the benefit of priority to U.S. Provisional Ser. No. 62/384,501 filed Sep. 7, 2016, all priority applications being incorporated by reference in their entirety.

STATEMENT OF GOVERNMENT SUPPORT

The invention disclosed in U.S. Provisional Application Ser. No. 62/280,569 filed Jan. 19, 2016, was made with partial government support under Contract DOE Grant No. DE-SC0013729 awarded by the U.S. Department of Energy, Nuclear Energy NEET. The government may have certain rights in this invention.

TECHNICAL FIELD

The present invention generally relates to the technical field of measuring fluid levels in a tank using a gravity meter and, in particular, and by way of example to a gravity-based, non-invasive system applicable to nuclear reactor systems as a method for monitoring the level of coolant in a reactor pressure vessel and also of reporting a gain or loss of coolant fluid in a nuclear reactor module.

BACKGROUND

Known sensors for measurement of coolant/fluid levels in a nuclear reactor module typically are invasive sensors, for example, differential pressure gauges, that must reside inside pressurized modules and must penetrate the module walls, for example, of concentric cylindrical vessels or a single cylindrical vessel, each having, for example, an outer vertical wall comprising, for example, an outer containment pressure vessel (CPV), sometimes referred to as simply a containment vessel or (CNV) and an inner reactor pressure vessel (RPV). Typical pressure ranges in a reactor pressure vessel are on the order of 1800 to 2250 PSI and may be within a larger range of 1000 to 3000 PSI. For example, reactor steam pressure may be typically measured by one or more pressure gauges of an RPV.

It is generally necessary that a nuclear reactor system be capable of providing measurements of the fluid level inside a reactor pressure vessel to an accuracy of a few centimeters, for example, for normal regulation of fluid level within a nuclear reactor module. An invasive fluid measurement system is typically used so that fluid level may be controlled, for example, via a Chemical Volume and Control System (CVCS), alternatively referred to as a Makeup/Letdown or a Makeup and Purification System. In the present patent application and claims, Chemical Volume and Control System shall be used generically to refer to all such systems. The CVCS circulates continuously to control both water chemistry and coolant fluid level. There are typically separate inlet and outlet lines for the CVCS. The CVCS typically utilizes fluid flow rate sensors to measure inlet and outlet flow rates. One purpose of the CVCS is to provide a means of regulating fluid level in a reactor so that the fluid level remains within a normal operating band. It is normal for a CVCS to add fluid or remove fluid, for example, from a reactor pressure vessel in order to maintain fluid level in a vessel within the operating band. On the other hand, a leak from a vessel, such as a reactor pressure vessel (RPV), to an external vessel, such as a containment vessel may be indicated by a drop in coolant level below the operating band lower limit. In such a situation, a lowering of the center of mass of the fluid contained within the reactor may indicate a leak, rather than normal fluid level regulation. The loss of fluid sometimes referred to as a LOCA (loss of coolant accident) may require immediate intervention, for example, initiation of an emergency core cooling system, remedial action and possible reactor shut-down and repair.

In a NuScale small modular reactor (SMR), for example, the CVCS lines penetrate both the RPV and the CPV, but the lines are not used to measure coolant level; (invasive level measurement systems introduced above may be used).

Two types of known invasive sensors used are differential pressure gauges for measuring pressure levels in a pressurized module and heated thermocouples. Another type utilizes a guided wave radar device that penetrates the top of the reactor module to measure the water level in the reactor module. Typically, for installation of either known invasive sensor type (or the radar type), the pressurized modules are pre-drilled to allow the invasive sensors to operate within the reactor module, which is typically cylindrical, and report the measurement result to systems outside the reactor module. The pre-drilling may increase the risk of the undesirable result of a leakage through the reactor module wall(s). A leak may take a long time to develop and so measurements are often taken as a time series. A slow loss of fluid may simply be a sign of normal fluid regulation by the CVCS. So factors in distinguishing normal operation from abnormal operation may include, but not be limited to, the rate of loss of fluid from the reactor module or the fluid level reaching a low fluid level below the band lower limit or the fluid level reaching a fluid level that does not compare with a computer processor estimated fluid level considering other systems such as flow rate, temperature and pressure systems other than the CVCS. The pressure within the pressure vessel may precipitate a vessel failure caused by the invasive nature of any invasive sensor installation through a wall of the reactor module.

One may recall the partial meltdown that occurred at the Three Mile Island nuclear reactor in Pennsylvania in 1979. It has been reported that the accident at Three Mile Island was caused by operator error based upon an erroneous estimate of coolant fluid levels in the reactor core. A coolant fluid level regulation problem may be a serious problem that requires a more efficient and accurate solution than an invasive sensor solution to the problem of monitoring fluid level in a reactor system.

Consequently, there is a need for an alternative method and apparatus and system for sensing fluid levels, for example in nuclear reactors, that is more accurate and more efficient than known invasive methods and systems for measuring fluid levels in a tank, such as are used in nuclear reactors.

SUMMARY OF THE DISCLOSURE

This summary is provided to introduce a selection of concepts. These concepts are further described below in the Brief Description and the Detailed Description. This summary is not intended to identify key features or essential features of the claimed subject matter, nor is this summary intended as an aid in determining the scope of the claimed subject matter.

The present invention meets the above-identified needs and solves the fluid level measurement problem by, for example, providing non-invasive measurement of a fluid level in a tank. One may mount at least one gravity meter (also referred to herein as a gravimeter or gravimetric mass sensor) outside the tank, preferably as close to the tank as possible, and derive the center of mass of fluid contained within the tank, eliminating noise caused by surrounding effects such as tidal influences, groundwater levels and the like. In one embodiment, one gravity meter may be located as close to the estimated center of mass of the fluid in the tank as possible so any detected gravity data is not impacted by measurements made of levels in tanks nearby the tank under analysis. The present non-invasive method of measuring fluid level may be utilized in a modular system architecture, for example, a pressurized system comprising a CPV and an RPV of a small modular reactor (SMR) or similar modules of other reactor architectures including the architecture of a large nuclear reactor. A module as used in the specification and claims refers to a container for a volume of fluid having a center of mass. Most nuclear reactors involve a tall cylindrical container or module which employs a reactor core to heat water to create steam under pressure which in turn drives a turbine to generate, for example, electricity.

Small Modular Reactors (SMRs) offer the promise of nuclear power that is potentially safer and less expensive than large nuclear plants. A known manufacturer and developer of SMR's is NuScale Power, LLC of Corvallis, Oreg. Other manufacturers of SMR's include Babcock and Wilcox (who, with Bechtel, formed Generation mPower LLC with research facilities in Bedford County, Va.) which is represented in the SMR market by their mPower SMR and Westinghouse Electric Company LLC near Pittsburgh, Pa., which is represented in the SMR market by their IRIS under development. Internationally, SMR's are being developed and produced, for example, in China, Korea and Argentina, among other countries, for providing electricity to the public electric grid, as well as for private industry applications in their respective countries and for export.

In a known NuScale architecture, several SMR modules, each comprising a concentric outer CPV and inner RPV described briefly above, may be situated side by side or in an array within a common coolant pool, while other SMR designs of other manufacturers may use a cooling air flow to cool the SMR modules. On the other hand, all SMR's and any cylindrical tank containing fluid would find useful a method and system of measuring coolant fluid level that is non-invasive. Moreover, besides determining level, the method and system may determine whether a given loss of fluid relates to normal operation or, possibly, a LOCA. For example, in the petro-chemical field, it is well known that a petro-chemical leak of certain petro-chemicals from a tank may require immediate remedial action and be quite expensive to cure and it may be also useful to determine the location of an abnormal leak so that the leak may be repaired.

Measurement of coolant fluid levels within nuclear reactors, as indicated above, is required for reliable and efficient operation and for control of fluid levels within a band of normal reactor operation. In accordance with the present invention, one embodiment of a gravity meter may be located on a platform proximate the center of mass of a tank (of a nuclear reactor module) containing fluid, typically comprising water and added chemicals, and pressurized steam for generating electricity. In order to accomplish the measurement in a coolant pool of water environment, the gravity meter may be placed, for example, in a dry, temperature controlled housing close to the pressurized vessels and/or on a stable platform that may be fixed to the ground level and/or the gravity meter may be fixed to the outside of the outer pressurized vessel or just outside or be attached to the reactor module itself. In order to avoid detecting data from another gravity meter of one reactor vessel proximate another reactor vessel, it is preferred that the gravity meter be mounted on the side of the module and, when one gravity meter is used, as close to an estimated location of a center of mass of the fluid in the module as possible.

Hence, an object of an embodiment of the present invention is to use one or more sensitive gravity meters to monitor nuclear reactor coolant fluid levels noninvasively, in particular, for an SMR design architecture wherein a module is typically mounted vertically, and the module is typically tall and relatively thin in diameter. According to the present invention, gravity meters may be used to measure a lowering of the center of mass of a fluid in a tank, for example, attached to an external vessel of a nuclear reactor module. One known gravity meter is the CG-5 AUTOGRAV™ gravity meter manufactured by Scintrex of Concord, Ontario, Canada. Another is the Micro-g Lacoste gPhone gravimeter available from Micro-g LaCoste of Lafayette, Colo., United States. Six Micro-G LaCoste gPhone Gravity Meters, in July 2008, captured the 12 May 2008 Sichuan, China earthquake with extremely high correlation. These gravity meters, however, may not be as sensitive as a superconducting type of gravity meter.

The superconducting type of gravity meter may operate by suspending a helium-cooled diamagnetic superconducting niobium sphere in a stable magnetic field. An example of a superconducting type of gravity meter is an iGrav meter manufactured by GWR Instruments Inc., of San Diego, Calif., United States. The iGrav meter has been measured to be more sensitive than the MicroG-Lacoste gPhone meter or the Scintrex CG-5 meter. Other gravity meters may be developed and offered commercially that may be even more sensitive and require less space. For example, the iGrav meter requires a separate system for super-cooling.

An object of measuring the changes of and a lowering of the center of mass of a fluid in a tank, for example, a fluid level in a nuclear reactor, may be achieved by applying at least one gravity meter, for example, one of the superconducting type or other gravity meter which accurately measures a fluid level in a given tank to within a few centimeters when a raising or lowering of the center of mass of the fluid in the tank occurs. The gravity meter monitors coolant fluid level in the tank when the gravity meter is placed proximate but outside of the tank, for example, a pressurized SMR reactor module. Known algorithms may be used to minimize noise, for example, ground water influences as will be further discussed herein. Some nuclear reactors rest within a coolant pool while others rest in an air-cooled environment.

For example, in the NuScale SMR architecture, a gravity meter may be mounted in a vertical open-ended cylinder on a stable mount in the benign environment of a coolant pool for one of a plurality of SMR modules. In other SMR architectures, the environment may be air and a gravity meter may be mounted to a side of a module not facing other modules so as to minimize noise that may be received by those other modules also having coolant fluid levels to be measured.

In one embodiment, a single gravity meter is mounted on a stable mount and may be attached to a reactor module at approximately one half to three quarters of the height of coolant fluid in the reactor module. The output data is output as a time series, for example, of gravimetric data at approximately one second intervals, not intended to exclude other data sampling intervals between less than a second and every minute or every hour, the point being that a fluid loss from any tank or an abnormal regulation of fluid level may occur at any time and be a slow or a fast leak. External gravity signals, such as earth tides, humidity changes in the weather and local ground water levels (soil moisture levels) may be sensed or estimated and separated from the gravimetric signal and excluded from the analysis of the fluid level in a tank. To this end, known software may be used with a computer data processing system to sense and to subtract the influences on gravity meters as noise from the data signals that sense the fluid center of mass in a tank and so monitor and regulate fluid level and/or detect a leak or gain of fluid over time. Whenever fluid level falls below a given level for a given reactor module, it may be necessary to actuate remedial measures.

We have determined that multiple gravimeters spaced vertically beside the vertical pressurized vessel(s) of a nuclear reactor module improve the measurement process, for example, a dual-gravity meter configuration is preferable over a single gravity meter. The expected signal from, for example, two gravity meters providing gravity data used for regulating the level of coolant in a module or two gravity meters may detect the occurrence of a loss or gain of coolant fluid in an actual reactor may produce a large difference data signal over a short period of time between the two gravity meters which may indicate (considering pressure, flow rate, temperature and other data taken for the reactor over the same time series) that the normal coolant regulation process is not operating properly or that a LOCA or other event has occurred. Perhaps, some remedial measures must be taken by reactor personnel to restart normal coolant regulation or minimize the impact of a LOCA. This two gravity meter configuration has been demonstrated to allow a resolution of water level monitoring using superconducting type gravity meters to about 3 cm, given typical noise levels and a desired signal-to-noise ratio (SNR) of 2-X (6 dB). A gravity meter system of one, two, three or more gravity meters may monitor fluid level and detect different types of fluid mass loss or normal or abnormal changes of fluid levels.

For a LOCA scenario where coolant is leaked outside the facility, for example, via a break in the Chemical Volume and Control System (CVCS) line outside the reactor module (for example, outside a NuScale SMR CPV), the usage of gravity meter measurements may differentiate that scenario versus a contained-leak LOCA where the water leaks, for example, in a NuScale SMR, from the pressurized RPV to the CPV and also may differentiate normal versus abnormal fluid level regulation. Also, the gravity meter measurements may incorporate input data from CVCS fluid flow sensors, temperature sensors and/or reactor pressure sensors as a time series of additional data which may help to indicate a normal or abnormal reduction or addition of fluid to the reactor containment vessel. In a NuScale SMR or other reactor module systems such as those of Westinghouse or Babcock and Wilcox, the non-invasive gravimetric meter system (referred to as a gravity meter in the specification and claims) of the present invention may determine coolant fluid level for regulating the CVCS line delivery and normal removal of coolant fluid as well as determine whether a LOCA has occurred.

Thus, a gravity meter deployment may comprise first or first and second gravity meters mounted above one another as close to a module as possible, preferably, at a location as far away from another module as possible. A third or third and fourth gravity meter may also be used at different locations vertically or horizontally to further reduce noise influences in a measurement system according to the present invention and to improve the accuracy of the measurement.

In an SMR having a coolant pool, the coolant measurement system may comprise a dry cylinder for holding one, two, or more gravity meters at specified heights on stable mounts and may be open at one end for, for example, power, refrigeration (for example, for super-cooling) and data cables, if necessary. Each non-invasive gravity meter or cylinder containing a gravity meter may be placed as closely as possible or even mounted to an outer vertical wall of the pressure vessel or, in a NuScale SMR, near or attached to the CPV, for example, in a coolant pool in a common tank of a NuScale SMR. The concepts and principles of using at least one gravity meter, associated software systems and other known systems such as flow-rate, pressure and temperature sensing to non-invasively probe in-reactor water levels will be described by the drawings and their brief and detailed descriptions below.

In an alternative preferred embodiment, then, at least two gravity meters may be mounted, for example, vertically in a cooling chamber of air. In a further alternative embodiment at least two gravity meters may be mounted in a dry cylinder fixed to the bottom of a coolant pool in at least a partially underground tank surrounding an SMR such that the top of the cylinder is open-ended. Data, refrigeration and power cables, (if needed) may exit the open upper end of the dry cylinder. The data cables may transmit time series gravity signal data, for example, once per second to a data processing system and signal a change in coolant fluid level via a display or other reporting or alerting system such as a sounder. Pressure, temperature and flow rate measurements may be taken at this same once per second time series. In this embodiment, one gravity meter is placed on a stable mount proximate the bottom of the fluid tank whose coolant fluid level is to be measured and, in an SMR, the other gravity meter may be placed on a stable mount at a point, for example, one half to three quarters of the height of the fluid in the tank, proximate to its expected center of mass. In another embodiment, a computer processor may rely on the many sensor systems available in a reactor setting for pressure, temperature, fluid level and fluid in-flow and out-flow to estimate the current fluid level in a reactor module for comparison with the fluid level determined by the one or more gravity meters. Other than cylindrical containment of the two or more gravity meters is also possible such as a container that is rectangular in shape but a cylindrical shape or any shape directly attachable to a module is preferred. One may prefer a shape, for example, that hugs and may be fixed to the outer surface of a cylindrical reactor module and has a curved outer wall and thus provides a means of achieving greater proximity of the gravity meters and related equipment to the nuclear reactor module and center of mass of the coolant fluid.

All of the embodiments and further embodiments under development comprise systems for measuring coolant levels in nuclear reactors and may be referred to herein as a GraviSense™ system available from Information Systems Laboratories, Inc.

Further features and advantages of the present invention, as well as the structure and operation of various aspects of the present invention, are described in detail below with reference to the accompanying drawings.

BRIEF DESCRIPTION OF THE DRAWINGS

The features and advantages of the present invention will become more apparent from the detailed description set forth below when taken in conjunction with the drawings in which like reference numbers indicate identical or functionally similar elements.

FIG. 3A represents an SMR power module in a pool under normal operating conditions.

FIG. 11 is a flowchart consistent with the claims and the specification showing a method of determining a loss or gain of fluid from first and second concentric container modules.

These drawings will now be described in some detail in the following DETAILED DESCRIPTION wherein similar reference numerals may be used to denote similar elements.

DETAILED DESCRIPTION

The present invention is generally directed to a method and apparatus for monitoring and automatically regulating the fluid level as well as possibly detecting a leak of fluid from a module, the module typically oriented vertically with respect to a gravitational field of the earth, via at least one gravity meter located next to or attached to the module (such as an SMR module comprising a tall cylindrical structure located in a coolant pool or air-filled structure). An SMR module is used by way of example of a nuclear reactor, but the present invention has application in large nuclear reactors (up to over 1000 MWe) as well as applications, for example, in monitoring fluid level and quantifying petro-chemical spills or, generally, leaks from any tanks or other chemical leaks from containers. While the module may be a fuel tank, petro-chemical tank or other tank, for example, on a tanker ship, the specific vessel/module investigated and for which an embodiment of the present invention may be utilized is exemplified by a small modular reactor (SMR) module.

One such small modular reactor (SMR) is described, for example, in some detail in "Highly Reliable Nuclear Power for Mission-Critical Applications," by J. Doyle et al. in Proceedings of ICAPP 2016, Apr. 17-20, 2016, San Francisco, Calif., incorporated by reference as to its entire contents using a NuScale SMR architecture by way of example. The Doyle article submitted by NuScale Power, LLC of Corvallis, Oreg. includes but is not limited to inclusion of a NuScale SMR plant design overview, analysis and a Table I showing calculated initiating LOCA event frequencies and Tables II-V showing, for example, how modules may be swapped in and out of an SMR reactor by number of modules and by given power levels in three cases of available power and module maintenance. Doyle et al. also discusses the percentage of time the plant may operate with an indicated number of SMR modules producing electric power.

Figure 1:
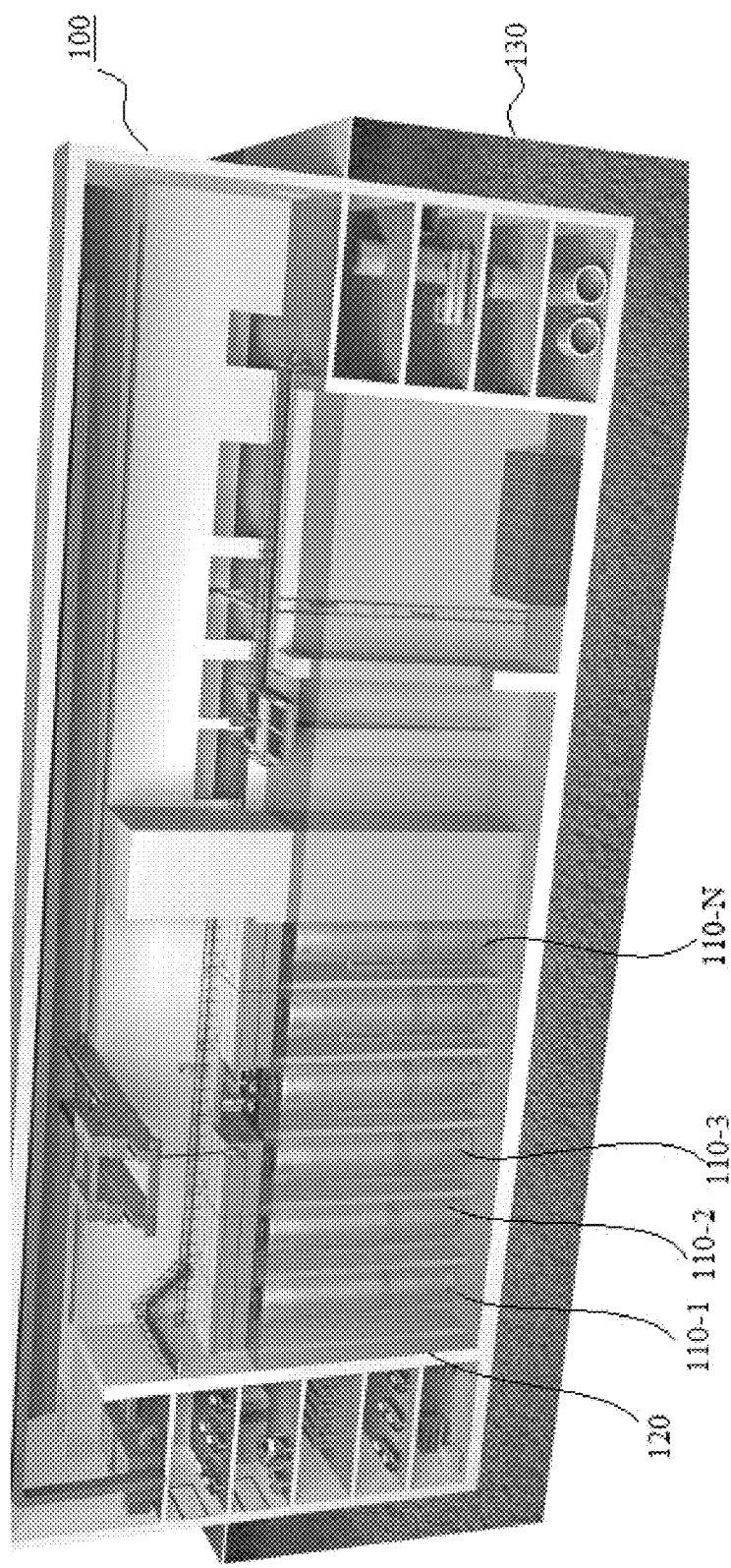
FIG. 1 comprises a PRIOR ART schematic picture of a particular type of nuclear power plant composed of individual reactor modules, for example, comprising tall concentric cylinders (containment and reactor) emplaced in a communal coolant pool for all modules, six module reactors shown in line with room for more. In one known embodiment, the modules may be formed, for example, in a 1×6 array, the modules separated in line by concrete walls. Six additional modules may be located on the opposite side of the cross section shown in FIG. 1, separated by a common canal to allow module movement for refueling, resulting in a twelve module plant.

Another NuScale SMR example is shown in FIG. 1 of the present application and described in priority provisional patent application U.S. Ser. No. 62/348,331 filed Jun. 10, 2016 of Jeffrey R. Ridgway, Scott H. Bloom and Daniel Adam Prelewicz, a priority application incorporated by reference in its entirety. Westinghouse Electric Company (coordinating a team of research companies) and Babcock and Wilcox (in cooperation with Bechtel forming Generation mPower LLC) and international manufacturers of SMR's may design their reactor modules differently from NuScale. However, the great majority, if not all SMR modules, are presently similarly constructed as tall, relatively thin, cylindrical modules having their reactor core at the bottom and steam collection for power generation near the top. A flow of fluid passes the reactor core directly or indirectly (using a steam generator) to create pressurized steam to drive an electric power generator. As discussed above, typically the level of fluid in the system is controlled, for example, via a Chemical Volume and Control System (CVCS) system (which is not, by itself, capable of measuring the level of the water). The CVCS requires a fluid level measurement that may be provided by the noninvasive gravity meter(s) of the present GraviSense™ system and method in order to control the level within a desired band. This task is typically accomplished by invasive sensors such as differential pressure sensors or heated thermocouples known in the art. According to the present invention, changes in or leakage of fluid from the SMR module (used as an example) may be exhibited as a shift of the center of mass of the fluid in the module up or down. Calculation of the center of mass noninvasively with at least one gravity meter, after eliminating noise influences, according to the present invention will assist to quantify a gain in fluid level or loss of fluid/coolant in the SMR module, and, if the loss exceeds a predetermined value for the SMR module (excluding normal CVCS operation to replenish fluid and excluding the pressurizer operating within a predetermined pressure range for the nuclear reactor), that a LOCA event or abnormal regulation of fluid level by a CVCS outside of a band has occurred and remedial action may be required.

A NuScale SMR is shown schematically by way of example only and is not intended to be limiting to the present invention. Similar reference numerals are used in the figures to represent similar elements, for example, a cooling pool shown as reference 120 in FIG. 1 is likewise shown in FIG. 2 and the first number of a reference number such as the 1 in 120 indicates the figure number where the element first appears. Another example is upper gravity-meter 220 in FIG. 2 not seen in FIG. 1 but first shown in FIG. 2 such that in subsequent figures such as FIG. 3A and FIG. 3B, upper gravity-meter 220 is seen but is shown to the right of the SMR module aligned vertically with lower gravity-meter 225 in the cooling pool 120 tank.

Referring to FIG. 1, a nuclear reactor including a number of modules is shown (for example, having an output of approximately 300 MWe or less) when compared to a large nuclear reactor operated by a major power company which are typically designed to produce 1,000 MWe or higher. These smaller, modular reactors 110-1, 110-2, 110-3 . . . 110-*n* are housed in a SMR building or structure 100 and may be partially or wholly below the ground level (earth) 130. The SMR modules typically may share a large tank or cooling pool 120 (or air cooling structure, not shown) shown in cross-section, and the coolant pool 120 filled to cover the modules 110. In some SMR reactors, the coolant pool may be replaced by an air conditioned room (not shown). This coolant pool 120 yields a fairly benign environment for an external-to-a-module gravity meter to operate in, as opposed to sensors that are invasive and must connect directly to inside the hot, pressurized and radioactive pressure vessels and are known from the prior art. FIG. 1 also shows room for additional modules than the six shown. The modules are typically tall on the order of 50-80 feet and wide, approximately 6 to 12 feet wide, and, as more clearly seen in FIG. 2, are wholly covered within the cooling pool 120 or air-conditioned room by coolant fluid, for example, water or air, and the modules may be separated from one another by concrete walls.

These smaller, modular SMR designs have an advantage of being fabricated at a factory and may be transported to a site by truck or rail where they are installed in an SMR building or structure 100 and actuated once a common cooling pool is filled or the structure air-conditioned (not shown). FIG. 2 will now be described in some detail.

Figure 2:
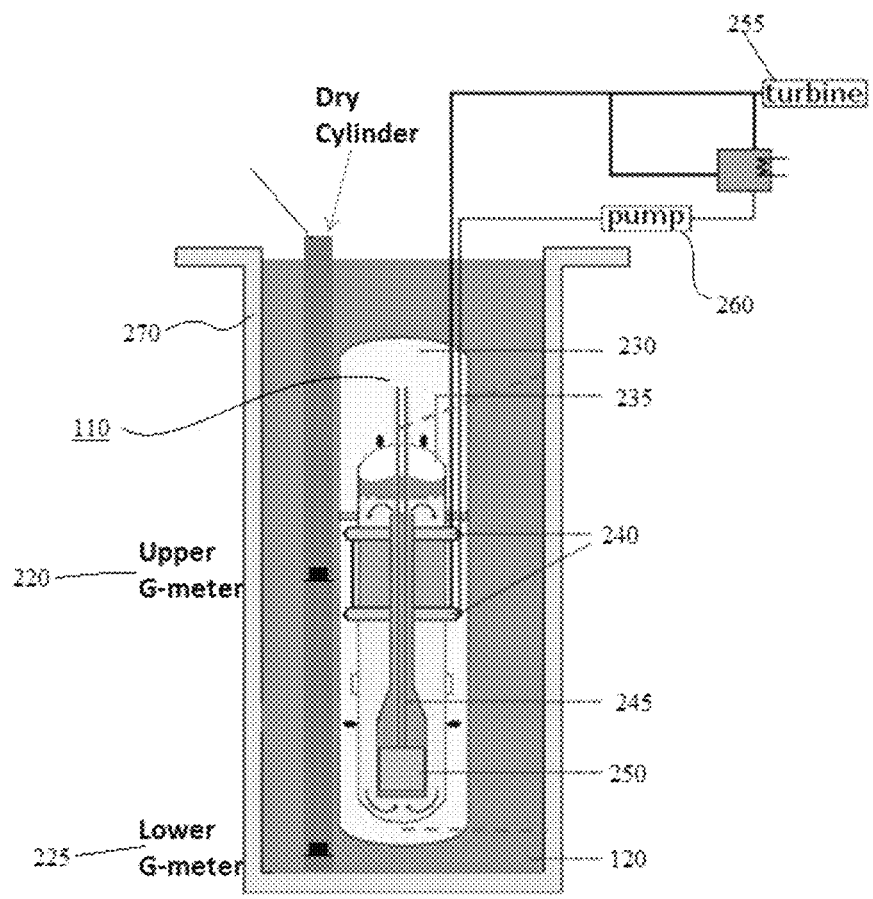
FIG. 2 is a schematic picture of a single SMR module in a tank and one embodiment of the present invention wherein an upper gravity meter is placed near the top of an RPV and the expected center of mass of coolant and a lower gravity meter is placed at the bottom, for example, within a dry cylinder mounted to the bottom of the cylinder module contained in a water filled pool (for example, as seen in FIG. 1) or to the floor of an air-cooled room common to all modules, or the gravity meter may be simply mounted as suggested by FIG. 2 within an air filled cylinder as far away or isolated from other reactor modules as possible. The cylinder may be wide enough to enable maintenance of the gravity meters with access from the top. Power, refrigeration and data cables if needed (not shown) may likewise exit, for example, the dry cylinder top end or, more generally, by the top of the SMR nuclear reactor module.

FIG. 2 is a schematic picture of a single SMR module in a cooling tank of a water-filled coolant pool 120 and one embodiment of the present invention wherein an upper gravity meter 220 is placed in the vicinity of steam generator headers 240 within an RPV 235. A lower gravity meter may be located at the bottom, for example, within a dry cylinder 210 mounted to the bottom of the water-filled pool 120 common to all modules as seen in FIG. 1; (in SMR modules of other manufacturers, air may surround the modules rather than water). The air cylinder 210, if used, and not to exclude other shaped volumes that may be used for stable sensor platforms, is preferably wide enough to enable maintenance of the gravity meters with, for example, access from the top. Access from the bottom is also possible through the ground 130 or the sides invasively, but the cabling then may be subjected to coolant pool water. Power and data cables, not shown, will likewise exit the dry cylinder 210 top end. The SMR module comprises a reactor pressure vessel (RPV) 235 having its own set of fuel rods 250, control rods 245, and steam pipes 240. Steam is shown differentiated at the top of RPV 235 as white in the gray scale drawing.

If the RPV leaks steam, then, the steam may condense against the relatively cool walls of the CPV and collect in the bottom of the CPV tank 230. (A drop in steam pressure and temperature may be sensed as well). Thus, in this scenario #1, a steady internal leak, the upper water level will gradually drop and the CPV will gradually fill up; (see FIG. 3B). In a second scenario #2, a CVCS line may break outside the CPV and allow the RPV 235 to leak externally, such that there is a loss of water from the RPV 235 but no gain in water by the CPV 230.

Still referring to FIG. 2, the narrow cylindrical geometry of the SMR module 110 lends itself well to placing a gravity meter (or meters) immediately adjacent to the CPV 235 in the cooling pool 120, for example, on stable mount(s) in a dry cylinder 210, if used. The gravity meter senses the change in gravimetric pull of the fluid mass (in the CPV/RPV module) as it transfers from top to bottom as indicated by, for example, the movement of the center of mass in FIG. 3B. The closer the gravity meter may be placed to the CPV wall, the better, so the distance to a location of a center of mass of fluid may be minimized. Compared with the prior art invasive sensor, the gravity meter will not penetrate the CPV or RPV wall in order to work properly. The gravity meter must have sufficient sensitivity to measure the changes of fluid level in an RPV and also the raising of fluid level in a CPV versus a normal fluid level regulation condition over time (scenario #1). Also, the gravity meter should be sufficiently sensitive to determine when the fluid level falls below a lower limit of a regulation band. It should be capable of determining a lowering of water level in an RPV with no water mass added to the CPV (scenario #2). Scenario #1 will be further explained with reference to FIG. 3A.

The impact of one gravity meter measuring gravity time series data of a single module is related as one divided by the distance squared to the center of mass of the fluid in a container. Consequently, the closer an upper or lower gravity meter is to the center of the fluid mass contained in the module, the more accurate the gravity measurement. Conversely, the influence of another, more distant second (or third or fourth) module in a nuclear reactor facility is minimized by this same distance squared factor. Moreover, any change in fluid level of a distant, for example, second module may be measured by a proximate gravity meter (or gravity meter pair) and so subtracted as noise from the gravity meter measurements taken by a gravity meter proximate the first module. As already suggested above, temperature, pressure, in-flow and out-flow fluid rates may be utilized to help differentiate normal fluid regulation from abnormal fluid level.

Figures 3A, 3B:
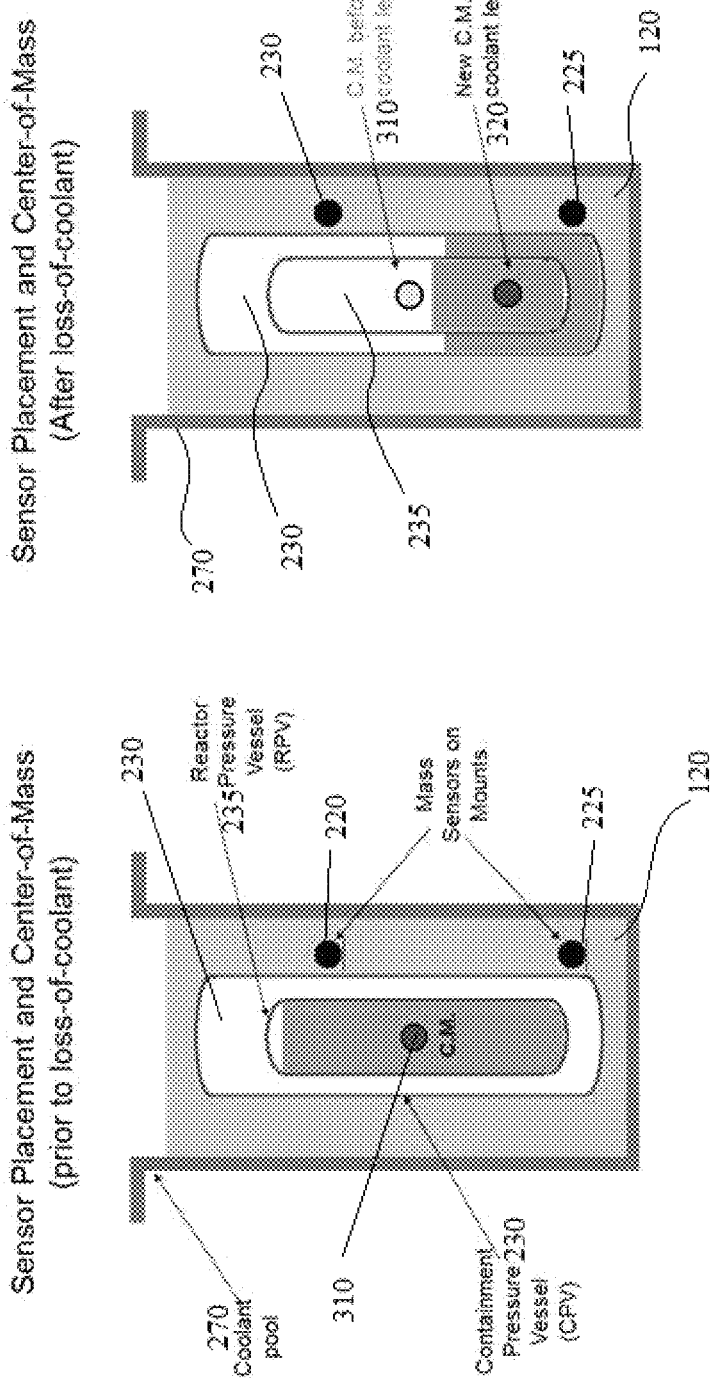
FIG. 3A shows gravity meter placement on the right side of the CPV on stable mounts above and below a center of mass of fluid within the RPV where the white cap represents steam.
FIG. 3B, on the other hand, represents an internal coolant leak scenario. In this scenario, as opposed to a CVCS external line break scenario, pressurized water may leak from the RPV to the CPV. The water may escape from the RPV (inner cylinder) as steam (reducing steam pressure) and condense as water, filling the CPV (outer containment cylinder). The two gravity meters at the two different locations are affected differently by the change in location of the water's center of mass as liquid level rises or lowers over time. Consequently, the original center of mass before a coolant leak rises or lowers to a new center of mass during normal fluid level regulation or after the coolant leak to a location closer to or further from the lower gravity meter. There may be fluid in the CPV leaked into the CPV from the RPV or via steam condensing as water into the CPV. In a scenario where a coolant line feed breaks outside the CPV, there may be no coolant fed to the CPV. The center of mass still lowers but is only a change in center of mass of the coolant in just the RPV, and the resultant center of mass is not a combined center of mass including the mass of water coolant leaked to the CPV. In any one of these scenarios, when the fluid level cannot be maintained within a predetermined band and falls below the lower level band limit, some remedial action may be required.

FIG. 3A shows gravity meter placement 220, 225 on a right side of the CPV 230 proximate the CPV wall on stable mounts (not shown) above and below a center of mass of fluid within the RPV 235 where the white cap again represents pressurizer steam. Steam flow to the turbine is generated in the steam generator with headers 240 and is used for generating electric power as seen in FIG. 2. FIG. 3A represents an SMR power module in a cooling pool 120 under normal operating conditions. FIG. 3B, on the other hand, may represent a coolant leak scenario #1 for an SMR module in a coolant tank having common pool 120. In this scenario #1, as opposed to the CVCS line break scenario #2, pressurized water may leak from the RPV 235 to the CPV 230. The water may escape from the RPV 235 (inner cylinder) as steam and may condense as water, filling up the CPV 230 (outer containment cylindrical). The two gravity meters 220, 225 at the two different locations are affected differently by the change in location of a center of mass 310 to new center of mass 320 after the LOCA coolant leak or abnormal CVCS regulation. Consequently, the original center of mass 310 before a loss of fluid lowers its level to a new center of mass 320 after the coolant fluid leak, to a location closer to the lower gravity meter 225. There will now be water in the CPV 230. In a scenario #2 where a CVCS line breaks outside the CPV, there is no coolant fluid fed to the CPV from the RPV 235. The center of mass still lowers but is only a change in center of mass of the coolant fluid in just the RPV 235, and the resultant center of mass is not a combined center of mass including the mass of coolant lost to the CPV 230 as in scenario #1.

Introduction to Gravitational Measurement

The Earth is a predominantly spherical mass that exerts a large, mean gravitational attraction at any location on its surface above or below sea level (influenced by the tides). However, all bodies of mass likewise exert gravitational force on each other according to the classic equation of gravitational force, which is proportional to the product of the two masses and inversely proportional to their distance from each other. Generally, the force caused by a local mass is described in terms of a "field," which is force per unit mass that would be felt by a unit test mass.

The most commonly used unit of gravitational acceleration is the Gal (named for Galileo) where 1 Gal=1 cm/sec$^2$. The Earth's mean gravitational field is approximately 980 Gal's. Calculations of expected fields resulting from water mass changes due to leaks in an RPV range, for example, from 1 to 26 µGal in range. Consequently, a very accurate gravity meter is needed. As mentioned above, there are a number of gravity meters which are commercially available. A gravity meter of the superconducting type may be preferable over other accurate gravity meters of different types such as those manufactured by Scintrex and Micro-g LaCoste. On the other hand, a gravity meter of the superconducting type has a disadvantage of requiring a nearby, connected super-cooling system to achieve super-conduction. Moreover, even more sensitive gravity meters may be commercially introduced in the future. An iGrav gravity meter instrument manufactured by GWR Instruments of San Diego, Calif., USA may be useful for simulating applicability in the present invention because it is small, has great sensitivity, can be placed and fit in, for example, a tall cylinder or be located as proximate as possible to an SMR module along with its super-cooling system, has small drift and may compensate for external gravity forces on the SMR module automatically (via using two or more such gravity meters, one above the other or at different locations, vertical or horizontal, and mounted on stable platforms). The external gravity forces may comprise, for example, earth tides, humidity changes, ground water levels, and local changes in soil moisture which are separated from the gravimetric signal(s) and some of these noise influences excluded from the analysis if two or more vertically spaced gravity meters are used and a difference signal over time calculated.

Considering the external noise signals in measuring a gravitational field because of tides, ground water, vibrations due to rotating equipment, movement of modules within the reactor facility, humidity and other such influences, a differential gravity measurement at different heights may be automatically provided by using two gravity meters, one above the other and subtracting their signals or by using a gravity gradiometer. Gravity gradiometers measure the spatial gradient of gravity using a closely-spaced pair of sensors. An embodiment as seen in FIG. 2 may utilize gravity meters placed, for example, fifteen to thirty feet apart, vertically, depending on the height of the SMR module and expected center of mass of the fluid in the module calculated by a computer processor as will be explained herein.

The tidal effect can exceed 250 µGal and is most easily removed using a known sophisticated tidal calculation algorithm, for example, as taught by V. P. Dehant et al. in "Tides for a Convective Earth," *Journal of Geophysics Research*, vol. 104, No. B1, pp. 1035-1058, 1999 and incorporated by reference as to its entirety. However, minor residual effects from tidal removal may remain and increase the level of long-period noise in the output gravity data for water level measurement thus decreasing signal-to-noise ratio. Again, these effects may be avoided by differencing the signal in a dual gravity meter or gravity gradiometer setup. Other time-varying effects such as humidity, ground water level, soil moisture and related effects beneath a gravimeter installation are likewise common to two gravitationally aligned gravity meters and may be removed as described by subtraction of one gravity meter data signal from the other. Thus, a multiple-gravity meter setup yields the lowest level of common-mode noise and produces a large signal-to-noise ratio for resolving changes in the level of reactor coolant fluid center of mass.

Referring to scenario #1 in FIG. 3A and FIG. 3B, if the total water mass inside the SMR module example of CPV and RPV is considered, then, as a leak progresses, the center of mass of the water moves downward over time. A single gravity meter mounted inside the coolant tank at the bottom of the CPV container and as close as possible to the CPV will experience a negative change in gravity over time as a leak progresses. This is because water mass is transferred from far above the single gravity meter to immediately above it and next to it laterally. Similarly, an increase in fluid level will move the center of mass upward and the single gravity meter will experience a positive change in gravity, for example, during automatic regulation of fluid level. Now, the single gravity meter model will be described in greater detail with reference to FIG. 4.

Figure 4:
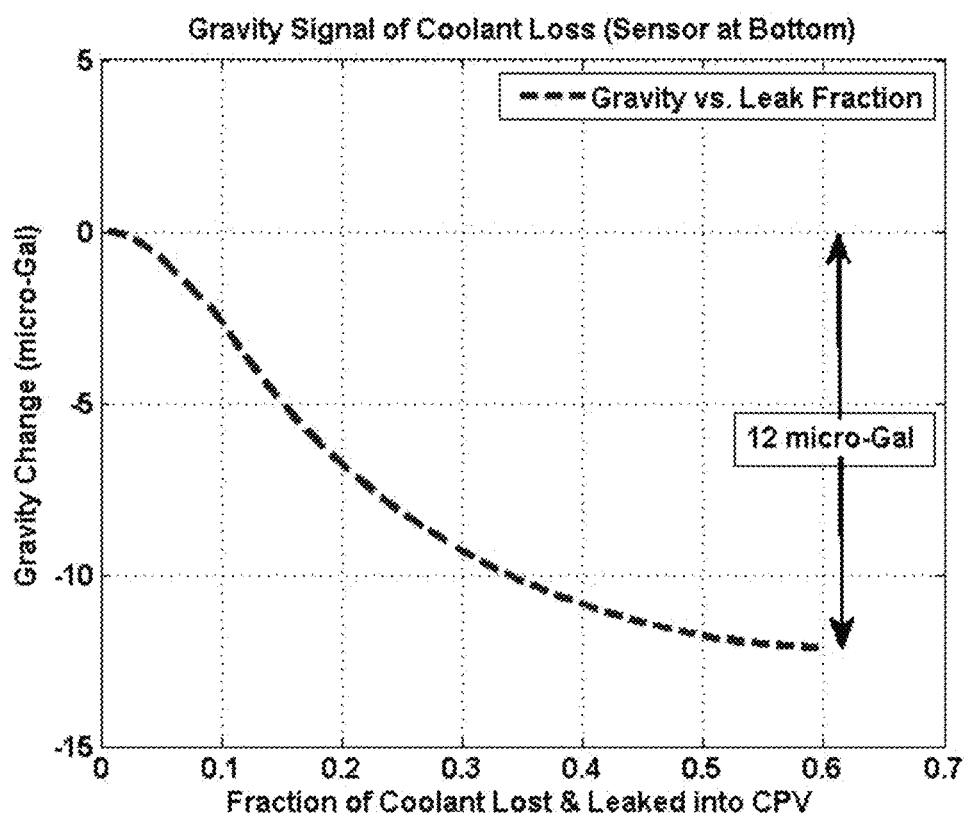
FIG. 4 provides a graph for showing the gravimeter data that results from a gain or loss of fluid scenario for a single gravity meter located proximate to the bottom of the CPV and slightly outside or mounted to its cylindrical outer wall (for example, mounted as the lower sensor shown in FIG. 2). The gravitational change is plotted in micro-Gal (µGal) where one Gal is one Galileo, a unit of gravity, versus the fractional loss of the coolant fluid from inside the RPV. At, for example, a 60% leakage fraction, the change in gravity is measured by the single gravity meter as minus twelve µGal, i.e. the dashed line shows a curve to a value of minus twelve µGal and to 0.6 (or 60%) over a time series of data measurements, for example, a measurement every second.

FIG. 4 provides a graph showing the gravity meter response for a leak scenario for a single gravity meter 225 located proximate the bottom of the CPV 235 and slightly outside its cylindrical outer wall (for example, mounted as the lower gravity meter 225 shown in FIG. 2). The gravitational change is plotted in µGal versus the fractional loss of the coolant from inside the RPV 235. The starting point is arbitrarily set to 0 µGal in this graph. At 60% leakage fraction, the change in gravity is measured by the single sensor 225 as minus twelve µGal i.e. the dashed line shows a curve to a value of minus twelve µGal and to 0.6 (or 60%) over a time series of data measurements, for example, a measurement every second. It may be seen that a single gravity meter may easily detect a gain or loss of fluid over time but will have some difficulty detecting which scenario has caused the gain or loss of fluid to occur and may alert for a LOCA or a lower level of coolant fluid under normal operation of a CVCS system but not identify what scenario caused a decrease in fluid level to occur, for example, to a level below the lower level of the regulation band. Temperature, pressure and in-flow and out-flow fluid rate sensors may assist in the differentiating normal from abnormal fluid regulation as well as determining if a fluid level falls below a pre-determined level of a fluid level regulation band. For example, if the determined level of fluid left in the module falls below the lower limit of the band or if the fluid level falls below a computer estimated level of fluid that may be out of the ordinary, remedial action or further testing may be required. Now, a two gravity meter differentiated in height and vertically one above the other proximate the SMR module as seen in FIG. 2 will be discussed for both scenarios with reference to FIG. 5.

Figure 5:
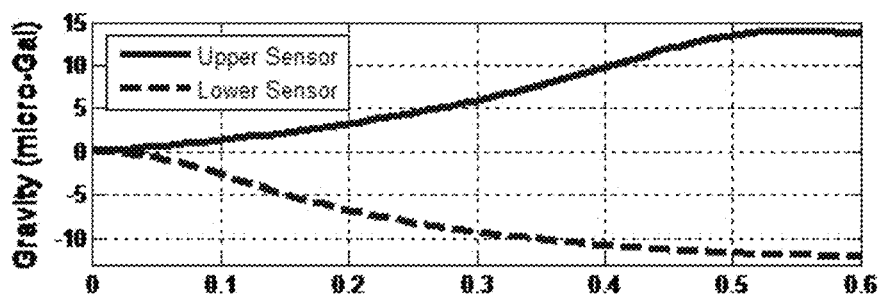
FIG. 5 provides graphs in solid line and dashed line for an upper sensor and a lower sensor located, for example, as per FIG. 2. Gravity is shown as a starting measurement point of 0 µGal for both graphs. A composite signal is formed on a gravity meter display and gravity data is output to a computer processing system, for example, as a time series once per second for comparison with temperature, pressure and flow rate data collected simultaneously. The composite signal is formed by an upper gravity meter signal in solid line where the upper gravity meter is placed approximately halfway up the RPV water height, and a lower gravity meter signal in dashed line output. The differential signal amplitude (between the solid line and the dashed line) may run from 0 at normal to 26 µGal in magnitude, which may flatten after a fractional loss of approximately 55% (0.55) coolant fluid is reached.

Referring to FIG. 5, there is shown a graphical plot of data collected from both an upper gravity meter 220 and a lower gravity meter 225 over time where the solid line graph represents the upper gravity meter data and the dashed line graph represents the lower gravity meter data signal over time. FIG. 5 thus provides graphs in solid line and dashed line for an upper gravity meter 220 and a lower gravity meter 225 located, for example, as per FIG. 2. Gravity is shown as a starting measurement point of 0 µGal for both the solid and dashed line graphs over time. A composite signal is formed on a gravity meter display and gravity data is output to a computer processing system, for example, as a time series once per second. The composite signal is formed by an upper gravity meter signal in solid line where the upper gravity meter 220 may be placed approximately halfway up the RPV water height and a lower gravity meter signal in dashed line output by the lower sensor, for example, at a, RPV/CPV module base level directly below the upper gravity meter 220. The differential signal amplitude (between the solid line and the dashed line) runs from 0 at normal to 26 µGal in magnitude, which flattens after a fractional loss of approximately 55% (0.55) coolant is reached. The differential signal clearly demonstrates that a loss of coolant fluid has occurred based on the measured location of the center of mass of the fluid (typically water mixed with chemicals) in the SMR module (for example, an RPV). The graph of FIG. 5 without further investigation could be interpreted as a scenario #1 or a scenario #2 LOCA event or could be normal regulation of coolant level depending on the rapidity of the change in location of the center of mass, for example, or whether the differential level of fluid measured by FIG. 5 suggests that the level of fluid has fallen below the lower limit of the fluid regulation band. Hence, a discussion of LOCA scenario #2 follows in a discussion of FIG. 6 showing LOCA Scenario #2 with reference to the SMR module and use of dual gravity meters 220, 225 with assistance of temperature, pressure and in-flow and out-flow rate sensors (not shown).

Figure 6:
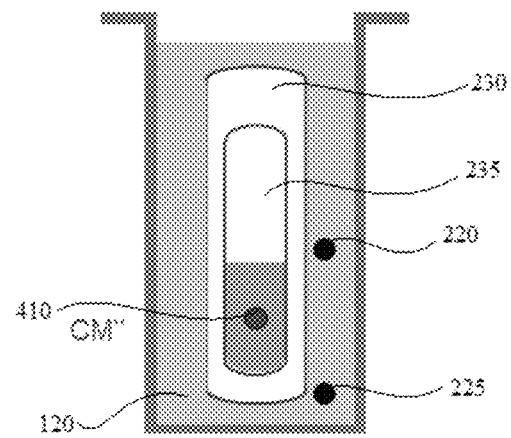
FIG. 6 is a schematic diagram of an alternative loss of coolant accident (LOCA) leak scenario showing how a loss or gain of coolant fluid may be determined by the apparatus of FIG. 2 using one gravity meter mounted above the other gravity meter. In this scenario, fluid may leak from inside the RPV and exit the CPV/RPV SMR module via, for example, a break in a CVCS line outside the CPV. Less mass may be in the system because no mass is in the CPV directly next to the lower gravity meter shown as CM".

FIG. 6 is a schematic diagram of an alternative loss of coolant accident (LOCA) leak scenario #2 showing how a leak may be determined by the apparatus of FIG. 2 using one gravity meter 220 mounted on a stable platform above the other lower gravity meter 225, both meters preferably mounted so as to be directly adjacent or even mounted to the exterior wall of the module. In this scenario #2, water may be lost from inside the RPV 235 and may exit the CPV/RPV RMS module via a break in a CVCS line (not shown) connected to the RPV 235 that bypasses the CPV and exits the module. The water level drops due to the outflow of coolant fluid through the CVCS line (not shown) and does not leak, for example, into the CPV 230. Less mass may be left in the system than in scenario #1 because no mass is in the CPV directly next to the lower gravity meter 225. The resulting center of mass is shown as CM" 410 and should be compared with CM 320 of FIG. 3B to understand that the mass of water is greater in FIG. 3B and scenario #1 than the mass of water remaining after a loss of fluid recorded for scenario #2 as seen in FIG. 6. This scenario as shown in FIG. 6 is identical to a deliberate removal of coolant via the CVCS line for coolant regulation purposes. In the regulated removal of coolant, however, the outward flow of water mass is a known quantity (for example, from an out-flow rate sensor appropriately located) and its gravity signal can be calculated and compared with the measured gravity data. In all further discussions, scenario #2 can be used interchangeably for a specific type of LOCA accident or a deliberate coolant removal via the CVCS for regulation. Now, FIG. 7 will be discussed to demonstrate the differential graphs of scenario #1 versus scenario #2.

Figure 7:
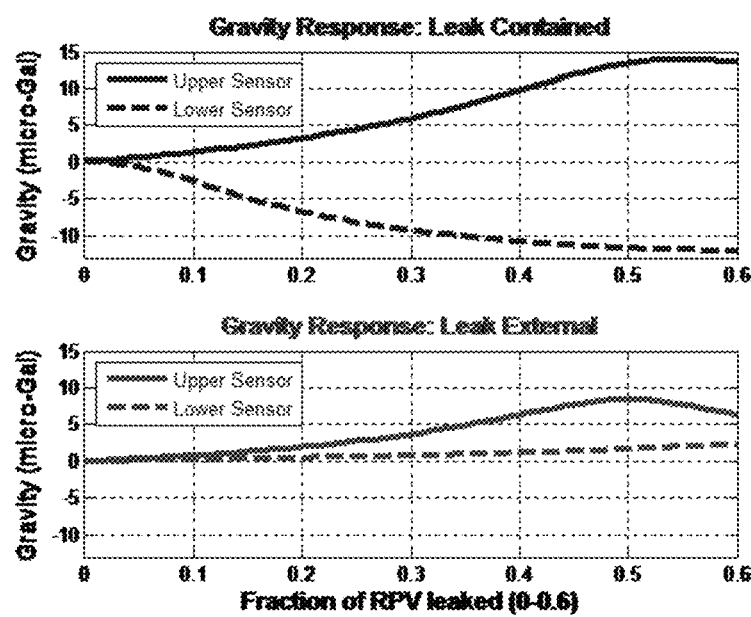
FIG. 7 provides graphs for both scenario #1, a loss of fluid from RPV to CPV (Leak Contained), and for scenario #2, (Leak External), a leak in the CVCS line that may bypass the CPV, i.e., may occur outside of the CPV. In scenario #1 (upper graph), the upper gravity meter in solid line exhibits a strong increase in gravity and the lower gravity meter a fairly strong decrease. In scenario #2 (lower graph), the upper gravity meter signal shown in solid line is weakly positive over time and the lower gravity meter signal shows a weak positive increase. Using two gravity meters, the two LOCA scenarios may be easily differentiated. Normal coolant regulation may also be inferred. Using just one gravity meter signal, either upper or lower, with other sensor systems it would be more difficult to differentiate the two scenarios and identify or alert as to which LOCA scenario or whether abnormal CVCS regulation has occurred, i.e., whether the weak signal change merely represents normal CVCS regulation of fluid level. One approach is to compare a single gravimeter signal value representing a fluid center of mass change to a computer estimated value of where a center of mass for the fluid should be located at a given point in time in view of all the reports of fluid flow and temperature and pressure sensor systems, including absolute pressure measurements.

FIG. 7 provides graphs for both scenario #1, a loss of fluid from RPV to CPV (Gravity Response: Leak Contained), and a leak for scenario #2, (Gravity Response: Leak External), a leak in the CVCS line that connects to the RPV 235 and bypasses the CPV. In scenario #1 (upper graph), the upper gravity meter 220 gravity data in solid line exhibits a strong increase in gravity and the lower gravity meter 225 demonstrates a fairly strong decrease as discussed above with reference to FIG. 5. In scenario #2 (lower graph), however, the upper gravity meter 220 gravity data signal shown in solid line is weakly positive over time and the lower gravity meter data signal shows a very weak positive increase. Using two gravity meters, the two LOCA scenarios may be easily differentiated from one another by the time series of the graphs of the gravity data signals from the two gravity meters and the assistance of other sensor data. But using just one gravity meter data signal over time, either upper or lower, it would be difficult to differentiate the two scenarios and identify or alert as to which LOCA scenario (leak contained or external) has occurred. Now, a data memory and data processing system will be discussed for detecting a gain or loss of fluid, the quantity of leakage or gain in fluid and differentiating between a scenario #1 or #2 with reference to FIG. 8.

Figure 8:
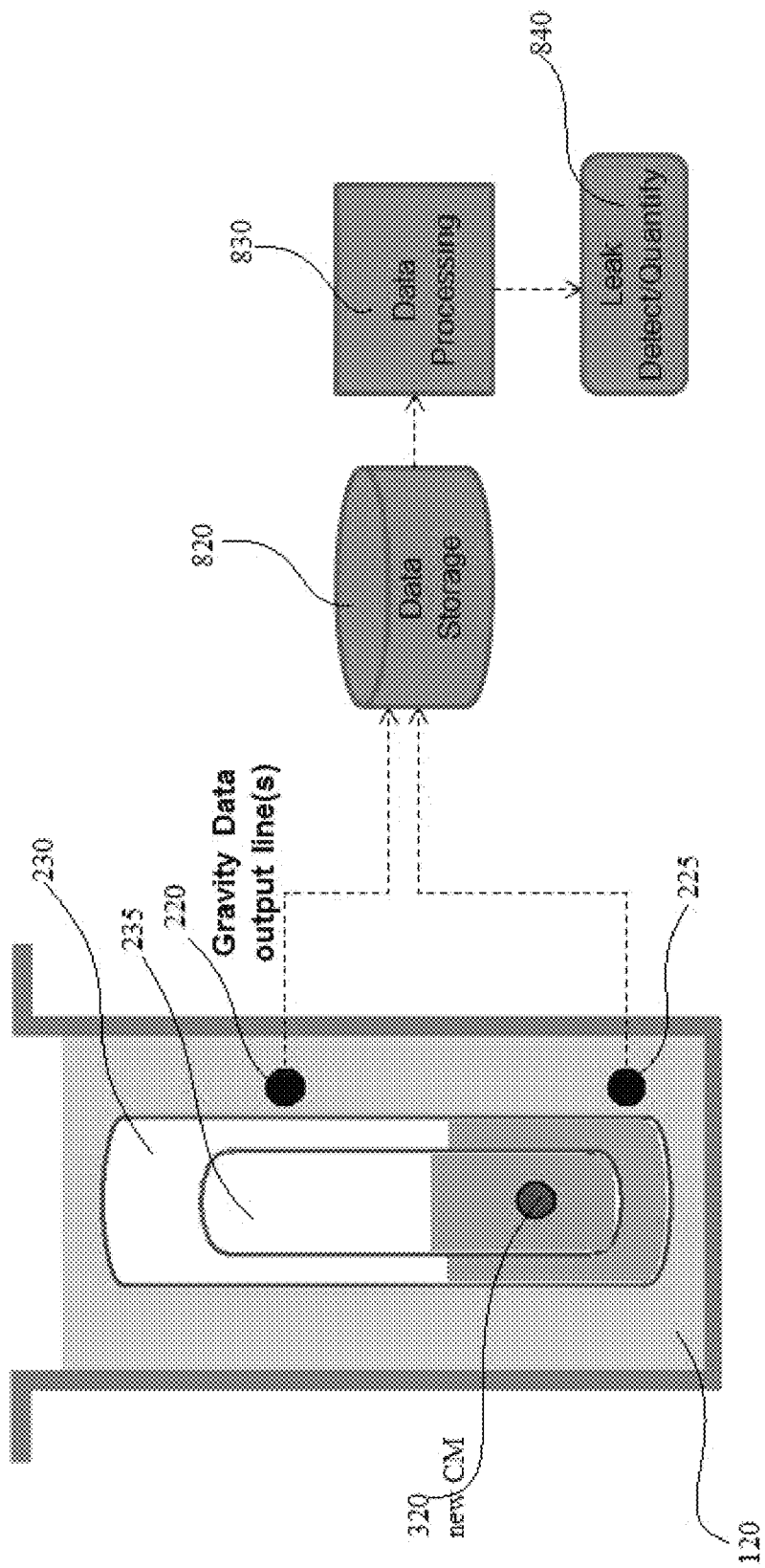
FIG. 8 provides a further schematic diagram similar to FIG. 2 showing an RPV vessel contained within and concentric with a CPV (similar to the architecture of the NuScale SMR), the upper and lower gravity meters and a LOCA leak scenario is occurring according to scenario #1 where water may have leaked from the RPV to the CPV and the resultant lower than normal center of mass. What is added to FIG. 8 are data flow lines (power, refrigeration and the like leads not shown) transmitting data, for example, in an air filled structure to the top of the structure, and in a NuScale coolant pool up the dry cylinder shown in FIG. 2 and to data memory or storage as a time series of data for each of two gravity meters proximate to the SMR module. These data time series are stored in processor memory and a data processing system comprising a programmed computer processor (as described below, having, for example, three modules for removing noise and outputting results) receives the time series of data for each gravity meter (as well as other sensor data such as pressure sensor, temperature, a water inflow rate sensor and a water outflow rate sensor. The software routines include one for subtracting out gravitational data from noise such as tidal, groundwater level and humidity and the earth location of the SMR. As will be explained further herein, there may be three or more software routines working together to analyze the time series of data to identify a LOCA Scenario #1 or a LOCA Scenario #2 or normal or abnormal regulation of water in the reactor, and thus allow personnel to take remedial action if necessary shown as a Leak Detect/Quantity box or result determination.

FIG. 8 shows a flow of data as seen in FIG. 3B for a contained leak scenario #2. The flow of data over the two lines shown from two vertically fixed gravity meters are processed by a computer (data processing) to determine if a gain or loss of fluid has occurred, whether it is a significant gain or loss and the quantity or magnitude of the leak over the time series of measurements. In the case of a loss of fluid or a lowering of the center of mass, the lower fluid level is determined and may be estimated in part by a computer processor from in-flow, out-flow, temperature and pressure data, and, if the fluid level is below a lower limit of a regulation band, then, remedial action may be required. Moreover, one scenario—contained—may be differentiated from another—external—and appropriate action taken. FIG. 8 also provides a further schematic diagram similar to FIG. 2 showing an RPV vessel 235 contained within and concentric within a CPV vessel 230, the upper and lower gravity meters 220 and 225 respectively, and a LOCA leak scenario according to scenario #1 where water has leaked from the RPV 235 to the CPV 230 and the resultant lower than normal center of mass 320. What is added to FIG. 8 are two data lines (power, refrigeration and the like leads, if needed, not shown) transmitting data, for example, up the dry cylinder 210 shown in FIG. 2, (but not shown in FIG. 8) and to data memory or storage 820 as a time series of data for the upper and lower gravity meters 220, 225 respectively (and other sensor data such as temperature, pressure, in-flow rate and out-flow rate data). The gravitational data from gravimeters are typically stored as a time series of gravity measurements in µGal. A data processing system comprising a programmed computer processor receives the time series of gravity data for each gravity meter and from in-flow and outflow rate sensors, temperature and pressure sensors and subtracts out gravitational data from noise such as tidal, groundwater level and humidity and the earth location of the SMR by subtracting one gravity meter signal from the other gravity meter signal at each time period, for example, each second. The computer processor may calculate what a fluid level should be with the measured fluid level and may determine if the fluid level likely has fallen below a predetermined lower limit of the fluid regulation band. As will be explained further herein, there may be three or more software routines working together to analyze the time series of gravity data and other data to distinguish a loss of fluid Scenario #1 from a loss of fluid Scenario #2 or a normal regulation of fluid level in the module, and thus allow personnel to take appropriate remedial action, if necessary, shown as a Leak Detect/Quantity box 840.

The placement of the gravimeter(s) can be rearranged and the present invention will still determine the location of the center of mass of a fluid containing module. The gravimeter(s) need to be proximate to the SMR module or other fluid containing module such as a combination of nuclear reactor pressure vessel (RPV) and containment vessel (CPV), but their exact location can be changed (e.g., the gravity meters) could be placed directly on top of the SMR module or other structure, or underneath, for example, in a below-ground cavity) and the method of measuring CM of a fluid in a container will still effectively monitor fluid level and distribution.

Software Discussion for a GRAVISENSE™ Fluid Level Measurement System of One or Multiple Gravity Meters In one embodiment of the present invention, three or more software routines are utilized. Data inputs may be provided from one or more gravimeters, plus detectors of, for example, the flow rates provided for in-flow and out-flow of a CVCS for a nuclear reactor, pressure in the module and temperature of the fluid at various vertical fluid levels. The data inputs may be provided to the software routines from a pressure sensor and from a temperature sensor to allow compensation for fluid density changes and permit the computer processor to estimate fluid level at a given point in time.

Firstly, the natural time-varying changes in gravitational magnitude (such as tidal effects) are calculated and removed from the data time series in order to determine whether changes in the gravity signal of importance to the reactor are observed (Routine #1). This is, for example, a subroutine to calculate and remove natural gravitational signals from the time series of measured gravity data, such as tides or local groundwater effects. Routine #1 is described by well-known scientific literature including but not limited to: Pertsev, B. P. "Tidal corrections to gravity measurements," in Izvestiya, Physics of the Solid Earth, July 2007, Volume 43, Issue 7, pp. 547-553 and see also: Dehant, V., P. Defraigne and J. Wahr, "Tides for a Convective Earth," Journ. Geophys. Res., Vol. 104, No. B1, pp. 1035-1058, 1999, incorporated by reference in their entirety.

If changes of importance in the gravity signal are observed, they are compared to a computed signal that is modeled from a calculation software subroutine (Routine #2), assuming an estimate of the change in coolant level within the pressure vessel. The signal thus calculated, when compared to the measured data, indicates whether or not a coolant loss has occurred, by a significant positive correlation between modeled and measured signal, and whether a significant loss of fluid above and beyond a normal loss of fluid (the measured level being within a regulation band) has been detected. (Routine #3). The amount of coolant fluid loss or gain can be quantified by the coolant software calculation (Routine #2).

Method of Calculation of Gravity Signal due to Change in Nuclear Coolant Levels

First, a method of calculation of a gravity signal due to a change in fluid levels will be discussed (referred to above as routine #2). The gravity signal due to a change in nuclear coolant levels may be calculated using a finite-element treatment of Newton's gravitational equation, utilizing knowledge of the geometry of the coolant fluid inside the reactor, the density of the fluid, and the position of the gravitational data collecting gravity meter with respect to the expected center of mass of the fluid. The gravitational equation is:

$$\vec{F}_{12} = \frac{Gm_1 m_2}{|\vec{r}_{12}|^2} \hat{r}_{12} \tag{1}$$

where $\vec{F}_{12}$ is the force exerted on the masses due to their mutual gravitational attraction, G is the gravitational constant, $m_1$ and $m_2$ are the mass of the objects, $\vec{r}_{12}$ is the distance vector between them, and $\hat{r}_{12}$ is the unit direction. Generally, we may describe the force caused by a local mass $m_2$ in terms of a gravity field $E_{12}$ at an observation point 1, which is force per unit mass that is felt by a test mass, and so Eqn. 1 above is modified so that only the source mass $m_2$ is left in the formula:

$$\vec{E}_{12} = \frac{Gm_2}{|\vec{r}_{12}|^2} \hat{r}_{12} \tag{2}$$

The gravitational field strength has identical units to acceleration. For gravitational studies, we use the units of "Gal" (after Galileo), where 1 Gal is 1 cm/sec$^2$. The magnitude of amplitudes that are measured in nuclear monitoring applications, lie between 0 and 26 micro-Gal (μGal), which is an extremely small quantity. The direction of the field is along the line between the observation point 1 and $m_2$. In general, gravimeters can only measure the vertical component of the field to the required level of sensitivity. The vertical component of Eqn. (2) is easily calculated from knowing the direction of $\hat{r}_{12}$. This component of the gravity field can be either positive or negative, depending upon the position of the source mass versus the gravity meter position. In order to evaluate Eqn. (2) for an actual large source mass, we define $m_2$ as a point mass and integrate Eqn. (2) over the source mass's entire geometry. This is well approximated using a finite element approach whereby the source mass is broken into small cubes (voxels), each voxel is assigned a mass $m_2$, the gravity field effect of the voxel's mass is approximated as a point mass using Eqn. (2), and all of the voxels that make up the volume of fluid are summed.

Figure 9:
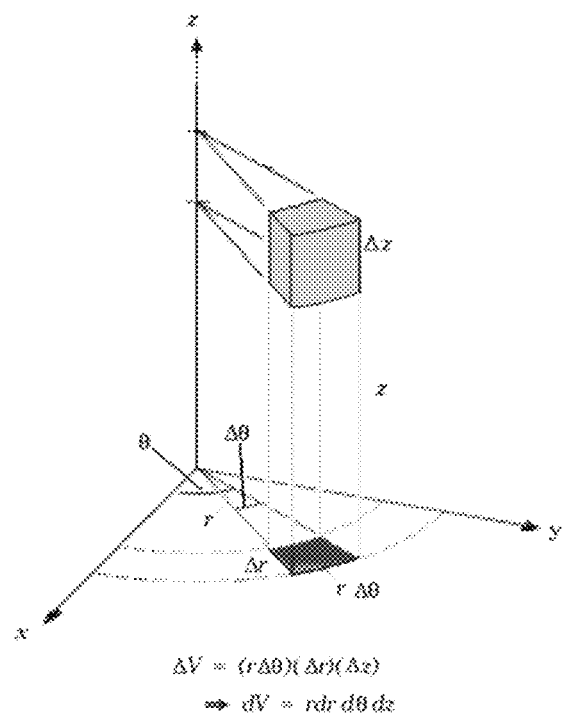
FIG. 9 shows a cylindrical coordinate system for breaking cylinder source mass up into finite elements, the cylindrical source mass, for example, comprising a mass of fluid contained in a cylindrical structure such as an SMR module. The finite volume (dV) at position R(r), θ and Z may be calculated as RdRdθdZ (rdr dθ dz per diagram FIG. 9)). Integration of the density over this volume provides the mass that is used in the computer calculations of the gravimeter response.

The first usage that may be made to the gravity calculation may be to approximate the nuclear reactor and its containment vessel as two concentric cylindrical structures, which hold coolant fluid. This is a simple geometric case and the voxels are created to make use of the cylindrical coordinate system to easily break the body into finite elements without resorting to cubicle voxelization programs (FIG. 9). In this figure, r, radial distance, becomes R in the below equation. The finite element at (R, θ, and Z) has a differential volume given by:

$$dV = R \, dR \, d\theta \, dZ \tag{3}$$

The finite element mass ($m_2$ in Eqn. 2) is simply the density ρ times change in volume dV: $m_2 = \rho dV$.

The gravitational effect of this finite element at an arbitrary position is itself a complicated formula, due to its odd shape. However, we can make use of the fact that, given an element of small volume and a distance to the calculation point that is many times greater than its characteristic size, the gravity effect of a differential cylindrical element is very well approximated by the gravity of a point mass of equivalent mass; (see Waldman, C., "Comparison of Gravimeter & Gradiometer Fields," ISL internal report for Contract N00024-04-C-4179, 2008, incorporated herein by reference as to its entire contents), which is calculated using the formula Eqn. (2). Thus, we may calculate the volume of the finite element and its center position, and compute the gravitational attraction due to an equivalent point mass, the calculation being simplified and rapid. The total gravitational effect of the cylinder is the sum over all finite elements that constitute the cylinder. The algorithm can compute the gravity field of the entire cylinder at any point and in any direction.

Figure 10:
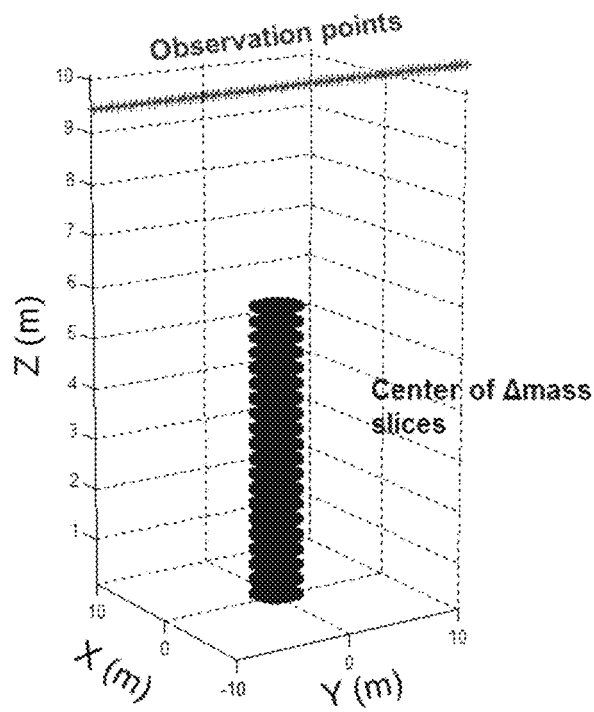
FIG. 10 shows an example of cylindrical gravity calculation program setup, with the center of each finite element in the cylinder, and observation points (at top). In this setup, the Z dimension is broken up, for example, into twenty center of change in mass slices, each of which contains, for example, three hundred sections of r and θ (FIG. 9).

In the program, the user sets the granularity of the finite elements in R, θ, and Z by setting the number of sections over the radial, circumferential and axial directions. FIG. 10 is an example plot of the finite elements from the cylindrical gravity calculation program setup. (The center of each finite element is plotted and the observation points shown.) The program was tested by setting an observation point on the cylinder axis and comparing to an analytical calculation from a Nettleton formula (1976); see Nettleton, L. L., "Gravity and Magnetics in Oil Prospecting," McGraw-Hill, New York, N.Y., 464 pp, 1976, incorporated by reference in its entirety. This calculation agrees with an analytical calculation to within 99.9%.

Method of Determining from Gravity Data Whether Coolant Levels Changed, and by How Much A method of determining from time series gravity data whether coolant levels have changed, for example, by how much, and, for example, by a predetermined amount signifying a significant gain or loss of fluid may have occurred, i.e. a LOCA or regulation event (a fluid level above an upper limit or below a lower limit of a fluid regulation band has occurred, is now described in some detail (routine #3). Referring briefly again to FIGS. 3A and 3B, this software module may have as its input the gravity data from two gravity meters, for example, in a vertical configuration as shown (gravity meters 220, 225) and are represented by black dots in FIGS. 3A and 3B). A third gravity meter can be used as a "remote" sensor to remove common-mode noise (not shown), which may be placed, for example, 25 to 100 feet away horizontally from the other two gravity meters on their respective upper and lower stable mounts (FIG. 2), for example, in a dry cylinder 210 or on a stable platform. In an alternative embodiment, a third gravity meter may be vertically aligned between the first two gravity meters or at a location above the upper gravity meter. For example, there may be third, fourth, fifth or more gravity meters for further improving accuracy, noise elimination and efficiency. Temperature, pressure, CVCS in-flow and out-flow rates and other data may be weighted and incorporated into the algorithm to determine normal versus abnormal level regulation in a known manner.

The data will be processed in the form of time series (for example, gravity data plotted vs. time). The data in each time series first have tides removed (see discussion of routine #1 for tide removal) and are low-pass filtered to remove high-frequency noise prior to the next step. If a horizontally remote gravity meter is used, then its time series is subtracted from the data of the two or more gravity meters proximate to the mass of fluid whose level is to be measured, in order to remove common-mode noise. In a situation where there is no leak in fluid, the residual time series (after tide removal and common-mode noise removal) should look flat over time. We can determine this by examining the slope of the time series of both gravity meters over a set time period (for example, fifteen minutes or one hour at one second intervals) and their slope values should be significantly less than the drift rate and/or root mean square (rms) noise level of an individual gravity meter. If the slope of each gravity meter's time series (#1 and #2) is indeed less than the specified drift rate, then no leak detection can be asserted. If the slope of the time series from both gravity meters exceeds the specified drift rate, then a gain or loss of fluid can be inferred and differentiated from a normal regulation of fluid in the module, and the amount of the gain or loss of fluid can be calculated by using routine #2 and by comparing the calculation to the data. Inherent in the invention is the fact that the data signal so derived can be used for normal coolant level regulation. If the level is decreasing toward the lower level of the control band then the flow into the RPV from the CVCS can be increased (and the in-flow rate should be reflected by a reading of an in-flow rate sensor). Similarly, if the level is increasing toward the upper limit of the control band then the flow from the CVCS can be decreased to a net output of fluid from the RPV.

FIG. 11 is a flowchart of the above-described process of a method of determining a loss or gain of fluid from first and second concentric container modules consistent with the above-described apparatus. The process starts at step 1100 with the acquisition of gravity signal data periodically over time. At step 1101, a first gravity sensor mounted, for example, above an expected center of mass of a fluid in a first concentric container module measures first gravity signals. The first gravity sensor is checked for a center of mass reading for a center of mass where fluid is entirely contained in an inner first concentric container. The object of the process is to discover if fluid has leaked from the inner first concentric container to a second outer concentric container or from the second concentric container module to outside the second concentric container module. At step 1102, a second gravity meter is mounted below the expected center of mass of fluid inside the first concentric container module for a second series of gravity signals. At step 1103, a third gravity meter may be mounted horizontal and distant from the first and second gravity meters. Step 1105 relates to calculating gravity drift rate over time and a predetermined value for the expected center of mass (when no leaks are occurring). Step 1106 is a step of removing common mode noise by subtracting the first and second gravity meter signals from one another or from the third gravity meter. Step 1108 discusses low pass filtering the gravity data to remove high frequency noise. Step 1109 calculates the center of mass (CM) of fluid over time at the location of the first and second gravity meters, and step 1110 evaluates when these start to show a lowering of the expected center of mass of fluid (by comparing them to the step 1109 CM calculations), for example, due to a leak from the first concentric container module to the next. Meanwhile, step 1104 determines CVCS, flow rate, temperature, pressure and any other sensors at a given time. Next step 1107 calculates the changes in gravity signals expected from changes in flow rate, temperature, pressure and any other sensors. At step 1111, one may determine if gravity falls outside a predetermined value using a computer processor. If Yes, then go to 1113; if No, go to 1112 and to 1100 to acquire more data over time. If the gravity signals fall outside of the predetermined value, then, step 1113 differentiates, by comparing the signals to the expected center of mass calculations, between: a) an internal loss of fluid occurrence, b) an external loss of fluid occurrence, and c) no loss of fluid. If Yes a) at 1114, then, call it an internal loss of fluid (from one concentric container module to the other at 1117) and if Yes b) call it an external loss of fluid (to outside of both concentric container modules) at 1116, and if Yes c) (normal fluid levels) go to 1115 and return to 1100 to acquire more data over time.

While various aspects of the present invention have been described above, it should be understood that they have been presented by way of example and not limitation. It will be apparent to persons skilled in the relevant art(s) that various changes in form and detail can be made therein without departing from the spirit and scope of the present invention. Thus, the present invention should not be limited by any of the above described exemplary aspects, but should be defined only in accordance with the following claims and their equivalents.

In addition, it should be understood that the figures in the attachments, which highlight the structure, methodology, functionality and advantages of the present invention, are presented for example purposes only. The present invention is sufficiently flexible and configurable, such that it may be implemented in ways other than that shown in the accompanying figures.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present invention in any way.

What we claim is:

1. A method of determining a loss or gain of fluid from a first and second concentric container module, the method comprising:

mounting a first gravity meter proximate to one of a vertical side and a top of the second concentric container module, the second concentric container module being external to the first concentric container module, the first concentric container module normally containing a mass of fluid, the first gravity meter being mounted above the mass of fluid normally contained in the first concentric container module, the first gravity meter for measuring a first time series of gravity signals, the first time series of gravity signals measuring a change in null of the mass of fluid normally contained in the first concentric container module, mounting a second gravity meter proximate to one of the vertical side and at the bottom of the second concentric container module, the second gravity meter mounted below the mass of fluid normally contained by the first concentric container module, the second gravity meter for measuring a second time series of gravity signals comprising a different change in pull of the mass of fluid normally contained in the first concentric container module responsive to a vertical distance between the first and second gravity meters, determining by a computer processor a change in gravimetric pull of the mass of fluid normally contained by the first concentric container module, the change in gravitational pull of the mass of fluid comprising:

subtracting the second timer series of gravity signals from the first time series of gravity signals; result of the subtraction representing excludable changes in pull of the mass of fluid normally contained in the first concentric module measured over time due to expected changes in at least one of tides, atmosphere, a value of drift of one of the first gravity meter and the second gravity meter and groundwater levels, the subtraction eliminating noise effects of recurring events comprising at least one of the changes in tides, changes in atmosphere, changes in drift of one of the first gravity meter and the second gravity meter and changes in groundwater levels, calculating, responsive to the subtraction, a first center of mass of the fluid in a combination of the first and second concentric container modules at a first point in time via the gravity signals output by the first and second gravity meters and calculating a second center of mass of the fluid in the first and second concentric container modules at a second point in time later in time than the first point in time, responsive to a difference between calculations of the first center of mass and the later in time second center of mass, evaluating, responsive to the subtractions, the gravity signals over time measured by the first and second gravity meters to determine an occurrence of one of a leak from the first concentric container module to the second concentric container module and a leak to outside the second concentric container module via a value or center of mass over time falling below one or another of first and second predetermined values.

2. The method of determining a loss or gain of fluid from first and the second concentric container modules of claim 1 further comprising:

low-pass filtering the first and second time series of gravity signals of the first and second gravity meters to remove high-frequency noise to aid in improving accuracy.

3. The method of determining a loss or gain of fluid from the first and the second concentric container modules as recited in claim 1 further comprising:

mounting a third gravity meter proximate to one of the first concentric container module and the second concentric container module and horizontal to and at a predetermined distance from the first and second gravity meters, one of the first, second and third gravity meters for measuring a third time series of gravity signals, and eliminating noise effects of recurring events responsive to changes in groundwater levels by differentiating the first, second and third time series of gravity signals.

4. The method of determining a loss or gain of fluid from the first and the second concentric container modules as recited in claim 1, further comprising:

defining $m_2$ as a point mass of a source mass of fluid and integrating the equation $$\vec{E}_{12} = \frac{Gm_2}{|\vec{r}_{12}|^2}\hat{r}_{12}$$

over a source fluid mass's entire geometry, calculating a gravity signal via at least one gravity meter due to a change in fluid levels using the equation $$dV = RdRd\theta dZ, \text{ and}$$

the finite element mass ($m_2$) being fluid density, $\rho$ times the change in volume, $dV$: $m_2 = \rho dV$.

5. The method of determining a loss or gain of fluid from the first and the second concentric container modules as recited in claim 1 further comprising:

mounting a third gravity meter one of vertically and horizontally distant from the first and second gravity meters for removal of common-mode noise.

6. The method of determining a loss or gain of fluid from the first and the second concentric container modules as recited in claim 1 further comprising:

differentiating among an internal loss of fluid from the first concentric container module, an external loss of fluid from the second concentric container module, and a normal or abnormal gain or loss of fluid occurring during normal regulation of fluid level of the first concentric contain module.

7. The method of determining a loss or gain of fluid from the first and the second concentric container modules of claim 1 further comprising:

measuring one of fluid temperature of fluid normally contained in the first concentric container module, pressure, and in-flow rates and out-flow rates of fluid flow to or from thirst concentric container module via at least one sensor of at least one of the first and second gravity meters at a given point in time.

8. The method of determining a loss or gain of fluid from one of fluid from the first and the second concentric container modules as recited in claim 7 further comprising:

calculating first and second gravity signal values by the first and second gravity meters at the given point in time responsive to measuring one of fluid temperature of fluid normally contained in the first concentric container module, pressure, and in-flow rates and out-flow rates of fluid flow to or from the first concentric container module.

9. The method of determining a loss or gain of fluid from the first and the second concentric container module as recited in claim 1 wherein the first concentric container module comprises a nuclear reactor container module containing fluid.

10. The method of determining a loss or gain of fluid from at first and the second concentric container modules as recited in claim 9 wherein the nuclear reactor container module comprises a nuclear reactor core at its bottom.

11. The method of determining a loss or gain of fluid from the first and the second concentric container modules as recited in claim 9 further comprising:

detecting a variation from a predetermined expected range of fluid level of a pressurizer of a nuclear reactor comprising the nuclear reactor container module containing fluid.

12. The method of determining a loss or gain of fluid from the first and the second concentric container modules as recited in claim 9 further comprising detecting a difference between a rate of inflow of water to the nuclear reactor container module, the nuclear reactor container module comprising a containment pressure vessel of the nuclear reactor container module, and detecting a rate of outflow of water to the containment pressure vessel, the flow of water regulated by a chemical volume and control system of the nuclear reactor container module within a level regulation band comprising an upper level and a lower level limit.

13. The method of determining a loss or gain of fluid from the first and the second concentric container modules as recited in claim 9 further comprising:

comparing the location of the center of mass of the fluid in the nuclear reactor container module with an estimated location of a center of mass of the fluid in the nuclear reactor module as determined by the computer processor from gravity signal data received from sensors of the first and second gravity meters.

* * * * *